United States Patent [19]
Bennett, Jr.

[11] Patent Number: 5,362,117
[45] Date of Patent: Nov. 8, 1994

[54] HOOK WITH SPRING LOADED LOCK-PIN

[75] Inventor: Tom Bennett, Jr., Corsicana, Tex.

[73] Assignee: James B. Bonham Corp., Corsicana, Tex.

[21] Appl. No.: 133,321

[22] Filed: Oct. 8, 1993

[51] Int. Cl.$^5$ .............................................. B66C 1/36
[52] U.S. Cl. ................................ 294/82.23; 24/600.8
[58] Field of Search ................ 294/82.1, 82.11, 82.17,
294/82.19–82.24, 82.35; 24/598.1, 598.3, 598.4,
598.7, 600.4, 600.5, 600.7, 600.8, 601.6; 59/85,
86, 89, 93

[56] References Cited

U.S. PATENT DOCUMENTS

| | | | |
|---|---|---|---|
| 809,511 | 1/1906 | Lien | 59/86 |
| 1,299,018 | 4/1919 | Pearson | 294/82.23 X |
| 2,232,997 | 2/1941 | Caldwell | 294/82.35 X |
| 3,462,945 | 8/1969 | Barber | 294/82.35 X |
| 4,453,622 | 6/1984 | Betz | 294/82.35 X |

FOREIGN PATENT DOCUMENTS

| | | | |
|---|---|---|---|
| 2826966 | 10/1979 | Germany | 294/82.23 |
| 3030041 | 2/1982 | Germany | 294/82.35 |
| 682440 | 8/1979 | U.S.S.R. | 294/82.35 |
| 1569314 | 6/1990 | U.S.S.R. | 294/82.35 |

*Primary Examiner*—Johnny D. Cherry
*Attorney, Agent, or Firm*—Parkhurst, Wendel & Rossi

[57] ABSTRACT

A hook is provided with a retractable, spring loaded lock-pin that is used to retain chain link, cable, etc., placed in the throat of the hook. The lock-pin is either biased in a retaining position or a retracted position. A mechanism is provided to positively lock the lock-pin in the retaining position if desired.

8 Claims, 4 Drawing Sheets

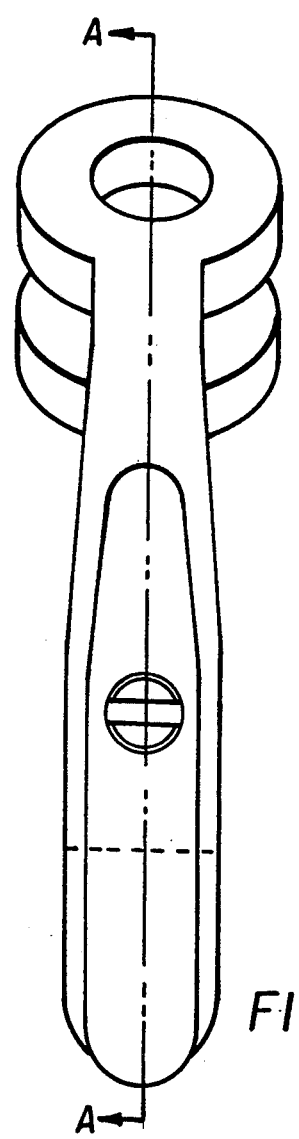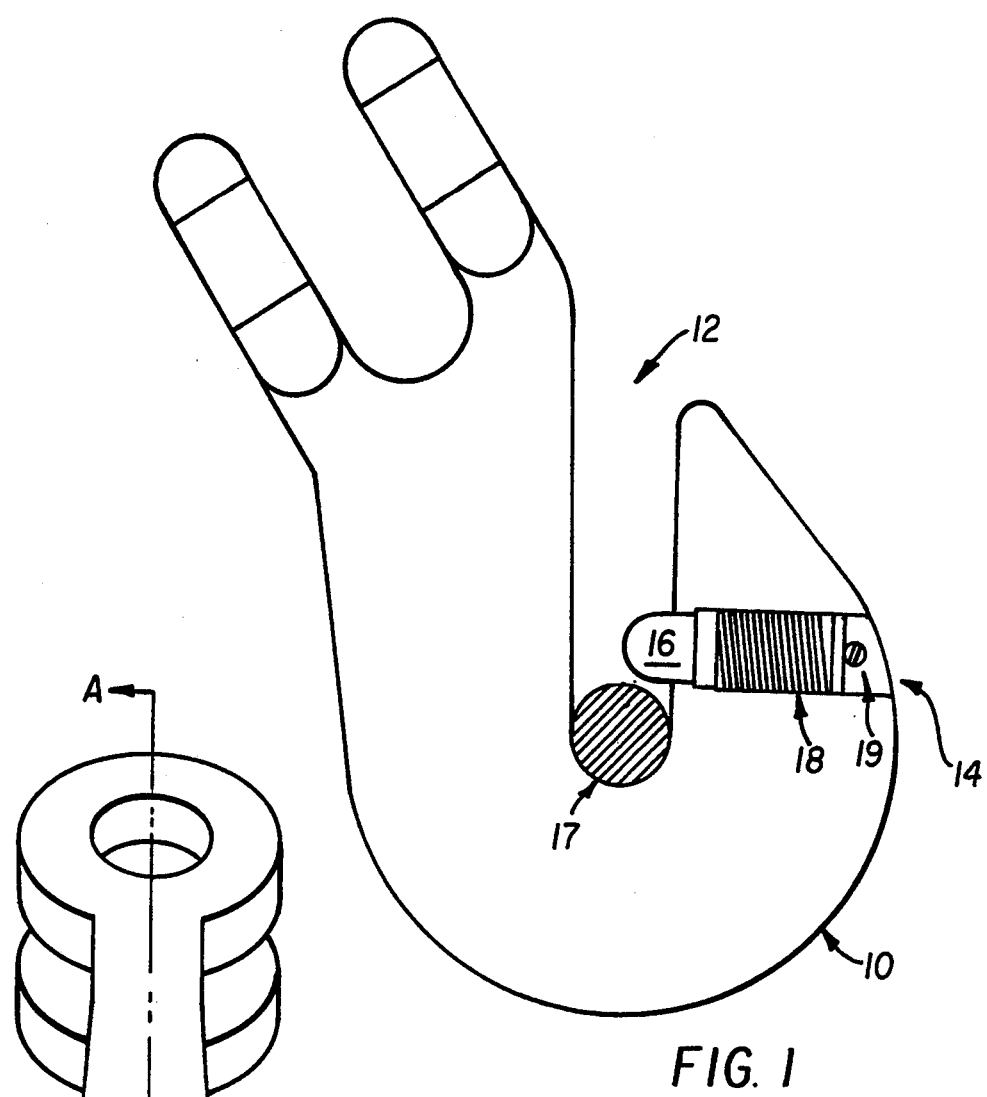
FIG. 1
FIG. 2

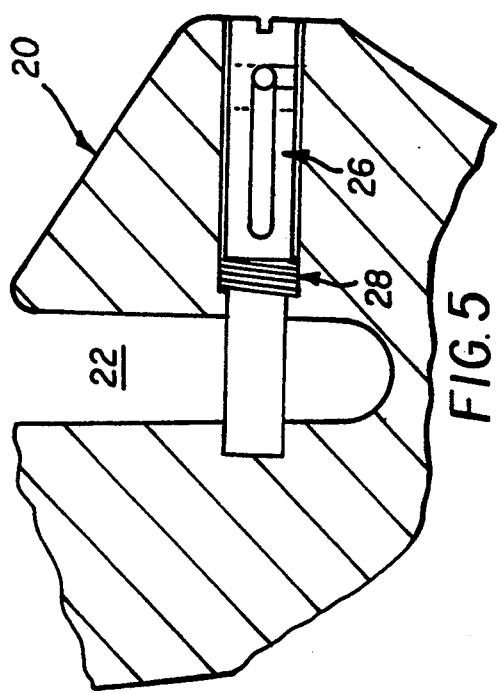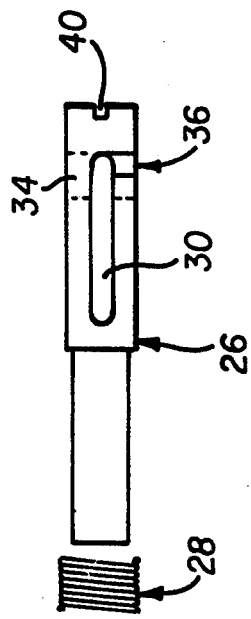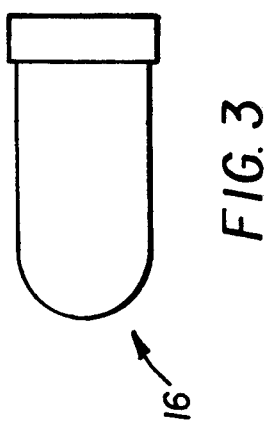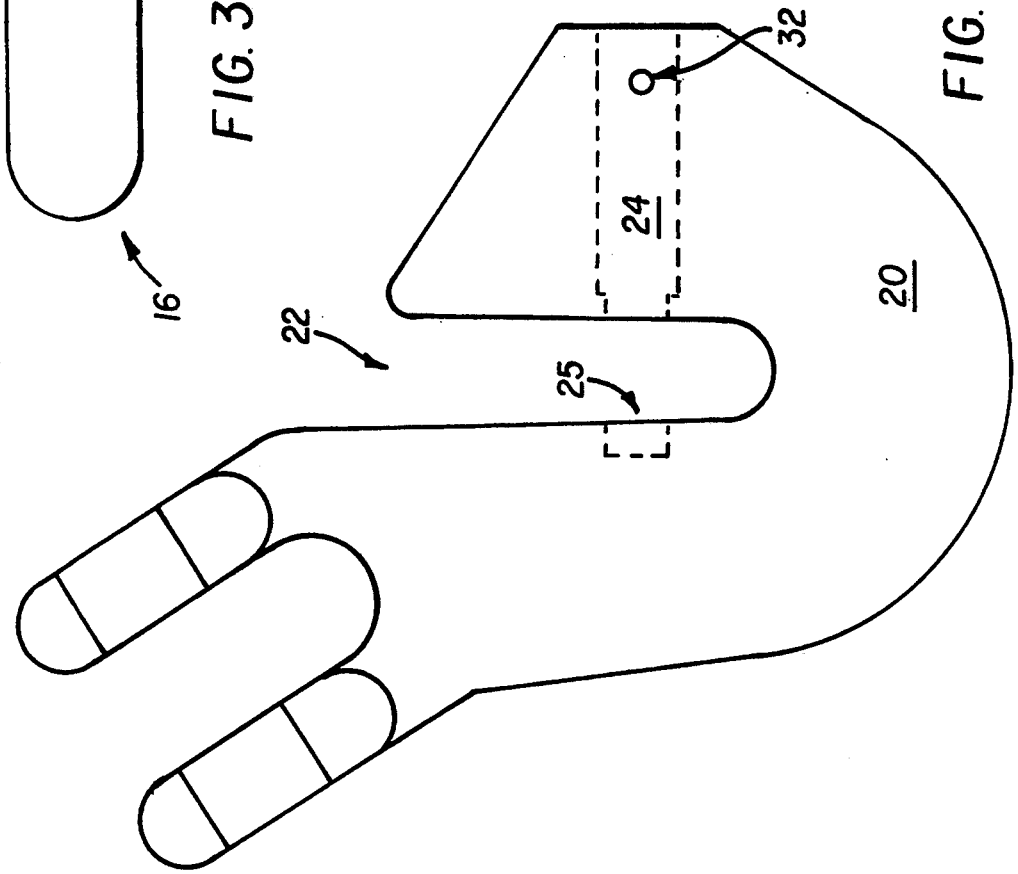

HOOK WITH SPRING LOADED LOCK-PIN

FIELD OF THE INVENTION

The invention relates in general to hooks used primarily with chain assemblies for lifting, towing and restraining loads. More specifically, the invention relates to grab hooks and a mechanism for preventing a chain from slipping out of the throat of the grab hook.

BACKGROUND OF THE INVENTION

Hook and chain assemblies have commonly been employed to lift, tow or restrain loads. Generally, the hook and chain assemblies include at least one closed or grab type hook having a throat which will accept and hold a link of the chain, but that will not permit adjacent links to slide through the throat. A common problem experienced with grab hooks, however, is that the retained link will frequently slip from the throat before tension is applied to the chain, thereby requiring the chain to be reconnected to the hook. The frequent slipping of the chain can cause a great deal of wasted time and effort, as well as aggravation to an operator attempting to utilize the hook and chain assembly.

Although many efforts have been made to develop hooks with chain retaining features, the efforts to date have failed to produce a hook of simple and inexpensive design that can reliably retain a chain link prior to the application of tension. It is therefore an object of the invention to provide a hook, of simple and inexpensive design, with a retaining mechanism for reliably retaining a chain placed within the throat of the hook.

SUMMARY OF THE INVENTION

The invention provides a hook with a retractable, spring loaded lock-pin that is used to retain chain link, cable, etc., placed in the throat of the hook. In a first embodiment, described in greater detail below, the lock-pin is normally biased in a retaining position. In other embodiments, the lock-pin is normally biased in a retracted position, and is movable to a locked retaining position. More specifically, in the first preferred embodiment, a hook is provided that includes a hook body having a throat, a lock-pin located within a hole provided in the hook body, and a biasing mechanism for biasing the lock-pin such that a portion of the lock-pin extends into the throat of the hook body. In the other embodiments, a hook is provided that includes a hook body having a throat, a movable lock-pin located within a hole provided in the hook body, a biasing mechanism for biasing the lock-pin in a retracted position within the hole, and locking means for positively locking the lock-pin in a retaining position.

BRIEF DESCRIPTION OF THE DRAWINGS

With the above as background, reference should now be made to the following detailed description of the preferred embodiments of the invention, wherein:

FIG. 1 is a side cross-sectional view of a grab hook in accordance with a first embodiment of the invention;

FIG. 2 is a end view of the first embodiment of the invention illustrated in FIG. 1;

FIG. 3 is a detailed diagram of a lock-pin used in the first embodiment of the invention illustrated in FIG. 1;

FIG. 4 is an exploded view of a hook in accordance with a second embodiment of the invention;

FIG. 5 is a cross-sectional view of the hook illustrated in FIG. 4;

DETAILED DESCRIPTION OF THE PREFERRED EMBODIMENTS

Figure 6:
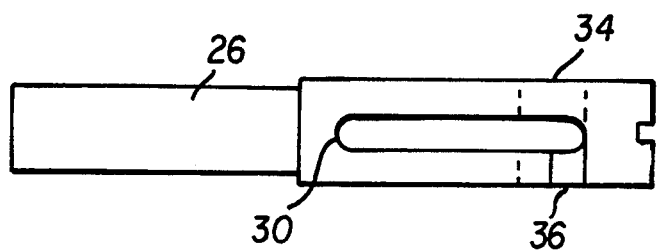
FIG. 6 is a first view of a lock-pin used in the hook illustrated in FIG. 4.

Referring now to FIG. 1, a grab hook in accordance with the present invention is shown in cross-sectional side view taken along a line A—A illustrated in the end view shown in FIG. 2. The hook includes a curved hook body 10 that forms a throat 12. The hook body includes a securing mechanism or means, in the illustrated example two eye-loops, for securing the hook body to an end of a cable or chain, and a generally U-shaped body portion extending from the securing means. The throat 12 is defined by the U-shaped body portion and is bounded by two side surfaces and a bottom surface, wherein the bottom surface is remote from the securing means. A recess or hole 14 is formed in the hook body 10 in one side or shoulder of the throat 12. A lock-pin 16 is located in the hole 14. The tip of the lock-pin 16 is preferably rounded (as shown in greater detail in FIG. 3) and, depending on the application, the body of the lock-pin 16 is made from either a plastic material or metal such as steel. A spring 18 is preferably held partially compressed against the lock-pin 16 by a roll pin 19, such that the lock-pin 16 is spring loaded.

In operation, a link of a chain 17 is placed or slid into the throat 12 of the hook. The force of the link against the lock-pin 16 causes the lock-pin 16 to retract and compress the spring 18. Once the link has passed the lock-pin 16, the expansion force of the spring 18 pushes the lock-pin 16 into its original position. The lock-pin 16 extends into the throat 12, thereby preventing the link 17 from slipping out of the hook. The retention force can be varied, based on the application, by utilizing springs having different spring forces.

While the first embodiment described above provides an improvement over conventional hook designs, it may be desirable to provide a hook with a lock-pin that can be positively locked into position for heavy lifting applications. Referring now to FIG. 4, a second embodiment of hook in accordance with the invention is shown that includes a lock-pin that can be positively locked. The hook includes a curved hook body 20 that forms a throat 22. A recess or hole 24 is formed in the hook body 20 in at least one side or shoulder of the throat 22. Preferably, a corresponding retaining hole 25 is formed in a second shoulder of the throat 22 opposite the first hole 24. A lock-pin 26 is located in the hole 24, but—in this case—a spring 28 is provided between the hook body and the lock-pin 26 as shown in greater detail in FIG. 5. The lock-pin 26 includes a first lock-slot 30 that cooperates with a roll pin 32 to permit movement of the lock-pin 26 within the hole 24, while preventing the lock-pin 26 from sliding out of the hole under the force of the spring 28, i.e. the lock-pin 26 can be moved back and forth with the roll pin 32 being located within the first lock-slot 30. A second lock-slot 34, rotated 90 degrees from the first lock-slot 30, is also provided in the lock-pin 26. A passage 36 is provided between the first lock-slot 30 and the second lock-slot 34 that permits the lock-pin 26 to be rotated until the second-lock slot 34 is aligned with the roll pin 32 (See FIGS., 6 and 7).

Figure 7:
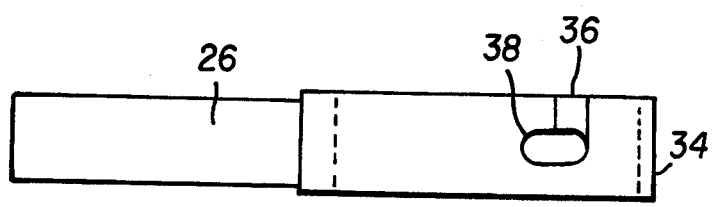
FIG. 7 is a second view of the lock-pin illustrated in FIG. 6.

In order to permit rotation of the lock-pin 26, a force must be applied to compress the spring 28 to align the roll pin 32 with the passage 36 as shown in FIG. 5. The lock-pin 26 is then turned until the roll pin 32 is aligned with the second-lock slot 34. The lock-pin 26 preferably incorporates a slot 40 to permit a screw driver, coin or other implement to be used in turning the lock-pin 26. The compression force is then released, and the expansion force of the spring 28 pushes the lock-pin 26 outward until the roll pin 32 meets a face 38 of the second lock-slot 34 shown in FIG. 7.

Figure 8:
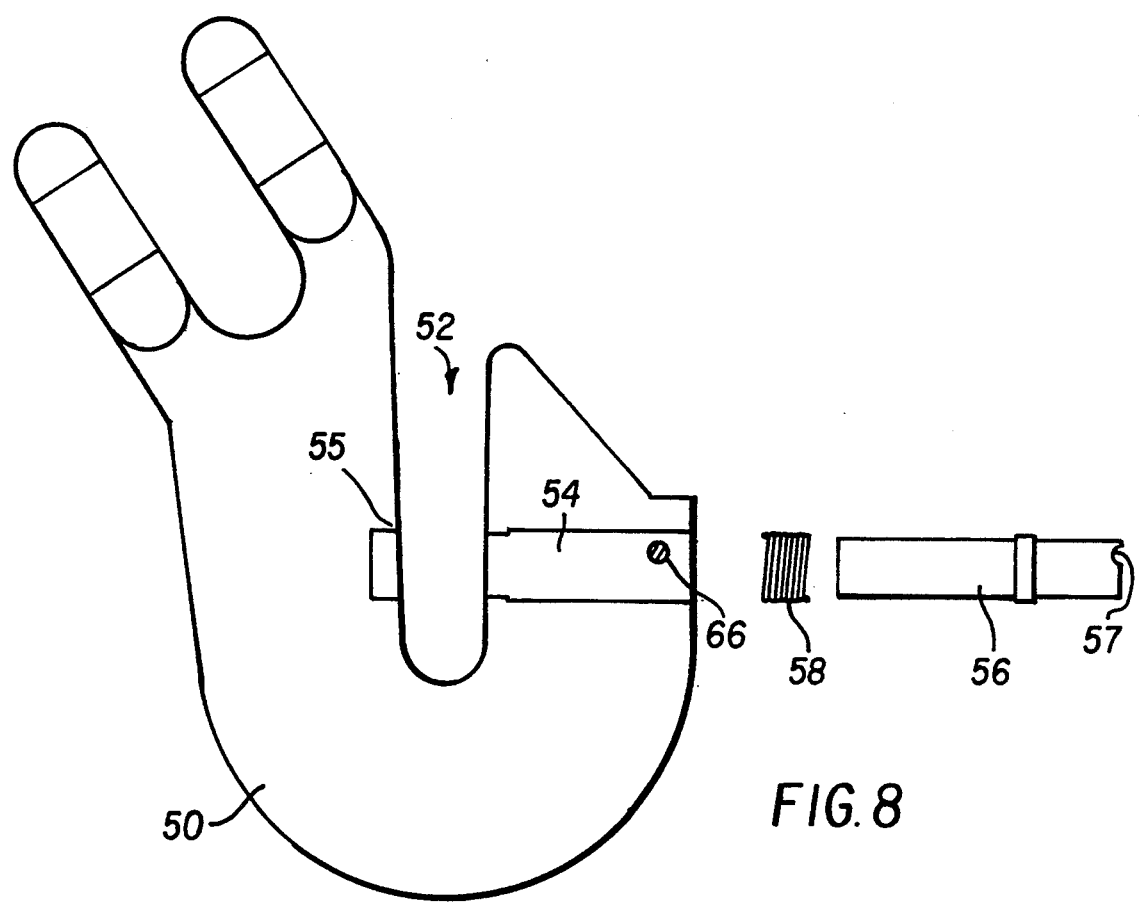
FIG. 8 is an exploded view of a hook in accordance with a third embodiment of the invention.

The second embodiment illustrated in FIG. 4 provides a lock-pin that can be positively locked to retain a chain placed in the throat of the hook. The design of the lock-pin to include the first and second lock-slots, however, is somewhat complicated to manufacture. A third embodiment of the invention incorporating a lock-pin of less complicated design that can be positively locked is shown in FIG. 8. The hook of the third embodiment includes a curved hook body 50 that forms a throat 52. A recess or hole 54 is formed in the hook body 50 in at least one side or shoulder of the throat 52. Preferably, as with the second embodiment, a corresponding retaining hole 55 is formed in a second shoulder of the throat 52 opposite the first hole 54. A lock-pin 56 is located in the hole 54 and a spring 58 is provided between the hook body and the lock-pin 56.

Figure 9:
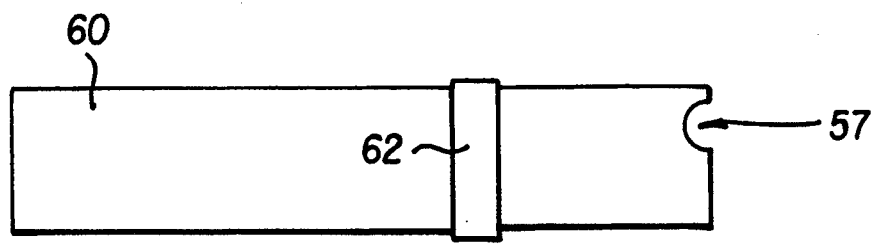
FIG. 9 illustrates a top view of a lock-pin used in the hook illustrated in FIG. 8.
Figure 10:
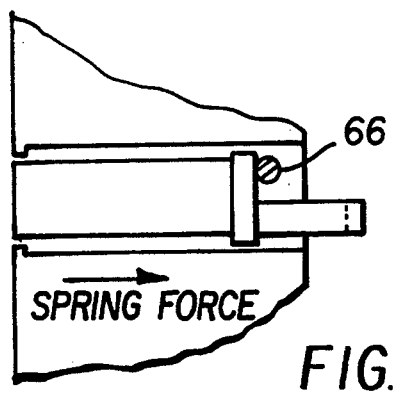
FIG. 10 illustrates the lock-pin of FIG. 9 located within the hook body of the hook illustrated in FIG. 8, wherein the lock-pin is in a retracted position.
Figure 11:
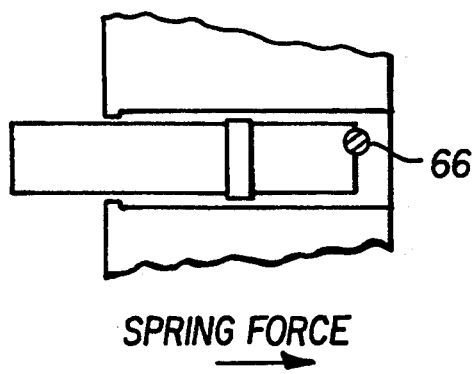
FIG. 11 illustrates the lock-pin of FIG. 9 located within the hook body of the hook illustrated in FIG. 8, wherein the lock-pin is in a locked retaining position.

In this embodiment, the lock-pin 56 includes a link retainer portion 60, a spring retainer portion 62 and a roll pin locking portion 64 as shown in FIG. 9. The link retainer portion 60 and the spring retainer portion 62 are substantially cylindrical, while the roll pin locking portion 64 is a half cylinder or flat protrusion. In operation, the spring 58 pushes against the spring retainer portion 62 to push the lock-pin 56 outward until an outer face of the spring retainer portion 62 contacts a roll pin 66. The roll pin locking portion 64 passes under the roll pin 66 as shown in FIG. 10. In this position, the link retainer portion 60 is retracted from the throat 52 of the hook. In order to lock the link retainer portion 60 into the throat 52, a force is applied to the lock-pin 56 to compress the spring 58. The lock-pin 56 is then rotated until a roll pin retaining groove 57 on the end of the lock-pin 56 is aligned with the roll pin 66. The force is then released and the expansion force of the spring 58 pushes the lock-pin 56 outward until the roll pin 66 engages the roll pin retaining groove. In this position, the link retainer portion 60 extends into the throat 52 to retain a chain link and the lock-pin 56 is positively locked by the placement of the roll pin 66 into the roll pin retaining groove as shown in FIG. 11. It should be noted that the spring 58 has been omitted from FIGS. 10 and 11 for clarity.

The invention has been described with reference to certain preferred embodiments thereof. It will be understood, however, that modifications and variations are possible within the scope of the appended claims. For example, the invention is not limited to grab hooks, but can be utilized on any type of hook. Also, the placement of lock-pins on the body of the hook can be varied.

Differently shaped lock pins can also be employed. In addition, the pin can be replaced with other elements to retain the spring within the hole. For example, in the first embodiment, the hole can be threaded and a screw can be used to retain the spring within the hole. Other modifications, encompassed by the scope of the claims, will be apparent to those of ordinary skill in the art.

What is claimed is:

1. A hook comprising: a hook body including a throat; a movable lock-pin located within a hole provided in the hook body, said lock-pin including a link retainer portion for traversing at least a portion of the throat of the hook body, a spring retainer portion extending from said link retainer portion, and a roll pin locking portion extending from said spring retainer portion; biasing means for biasing the lock-pin in a retracted position within the hole; and locking means for positively locking the lock-pin in a retaining position, said locking means comprising a roll pin which passes into the hole, wherein the roll pin contacts an outside face of the spring retainer portion to hold the lock-pin in a retracted position and contacts a groove provided in an end surface of the roll pin locking portion to hold the lock-pin in a retaining position.

2. A hook comprising:
   a hook body including securing means for securing the hook body to an end of a cable or chain and a generally U-shaped body portion extending from said securing means, said U-shaped body portion defining a throat bounded by two side surfaces and a bottom surface, said bottom surface being remote from said securing means;
   a movable lock-pin located within a hole provided in the hook body;
   biasing means for biasing the lock-pin in a retracted position within the hole; and
   lock retaining means for positively locking the lock-pin in a retaining position;
   wherein the lock-pin comprises a link retainer portion for traversing the throat, and a spring retainer portion extending from the link retainer portion;
   wherein said lock retaining means comprises a roll pin which extends into the hole; and
   wherein said lock-pin further comprises a roll pin retaining portion extending from said spring retainer portion for receiving said roll pin in the retaining position of the lock-pin.

3. The hook of claim 2, wherein said roll pin retaining portion includes a groove provided in an end surface of the lock-pin.

4. The hook of claim 2, wherein the roll pin contacts an outside face of the spring retainer portion to hold the lock-pin in the retracted position.

5. The hook of claim 2, wherein the biasing means comprises a spring.

6. The hook of claim 2, wherein said securing means comprises at least one loop extending from the U-shaped body portion.

7. The hook of claim 6, wherein said securing means comprises two loops.

8. The hook of claim 2, wherein said roll pin retaining portion comprises a first lock slot, a second lock slot and a passage for connecting the first lock slot to the second lock slot, the roll pin cooperating with said first lock slot, said second lock slot and said passage to prevent movement of the lock-pin from the retaining position to the retracted position.

* * * * *